(12) United States Patent
Simons et al.

(10) Patent No.: US 8,732,916 B2
(45) Date of Patent: May 27, 2014

(54) BAND CLAMP WITH REDUNDANT LOAD PATH

(75) Inventors: Randall E. Simons, San Jose, CA (US); Steven Lee Wittmer, Livermore, CA (US); James S. Bray, Pine Grove, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 331 days.

(21) Appl. No.: 13/164,414

(22) Filed: Jun. 20, 2011

(65) Prior Publication Data
US 2012/0317753 A1 Dec. 20, 2012

(51) Int. Cl.
*F16L 33/24* (2006.01)
*B23P 17/00* (2006.01)
*B23P 11/00* (2006.01)

(52) U.S. Cl.
USPC .................. 24/268; 24/278; 24/279; 24/284

(58) Field of Classification Search
USPC ........ 24/19, 268, 278, 279, 284; 285/34, 403, 285/407, 408; 292/256, 256.6, 256.65, 292/256.67
See application file for complete search history.

(56) References Cited

U.S. PATENT DOCUMENTS

| | | | | |
|---|---|---|---|---|
| 2,353,572 A | * | 7/1944 | Kuster et al. | 285/408 |
| 3,744,825 A | * | 7/1973 | Cooper et al. | 285/407 |
| 4,128,921 A | * | 12/1978 | Heinze et al. | 24/279 |
| 4,469,354 A | * | 9/1984 | Caldwell | 285/2 |
| 4,488,744 A | * | 12/1984 | Bubeck et al. | 285/408 |
| 4,640,530 A | * | 2/1987 | Abbes et al. | 285/18 |
| 4,715,565 A | * | 12/1987 | Wittmann | 244/173.1 |
| 4,919,453 A | * | 4/1990 | Halling et al. | 285/3 |
| 5,277,458 A | * | 1/1994 | Tschann | 285/411 |
| 6,050,615 A | * | 4/2000 | Weinhold | 285/409 |
| 6,401,958 B1 | * | 6/2002 | Foss et al. | 220/320 |
| 7,328,488 B1 | | 2/2008 | Gallo | |
| 7,329,157 B2 | | 2/2008 | Maxwell et al. | |
| 7,425,023 B2 | * | 9/2008 | Hartig et al. | 285/367 |
| 7,922,125 B2 | | 4/2011 | Lancho Doncel | |
| 2007/0022574 A1 | * | 2/2007 | Belisle et al. | 24/19 |

OTHER PUBLICATIONS

"Marman Clamp System Design Guidelines", Dec. 9, 1998, NASA Preferred Reliability Practices, Guideline No. GD-ED-2214, downloaded from http://engineer.jpl.nasa.gov/practices/, 8 pages.

* cited by examiner

*Primary Examiner* — Robert J Sandy
*Assistant Examiner* — Louis Mercado
(74) *Attorney, Agent, or Firm* — Weaver Austin Villeneuve & Sampson LLP

(57) ABSTRACT

Techniques for detachably joining a first component and a second component includes a band clamp, a tensioning device, a plurality of shoes, and a plurality of brackets. The band clamp is configured to cause the plurality of shoes to engage an abutting cylindrical flange of each of the first component and the second component and to provide a sufficient clamping pressure to join the first component with the second component. Each of the plurality of brackets is attached to one of the first component and the second component. The sufficient clamping pressure results from redundant, independently inspectable, sources, a primary redundant source being circumferential tension in the band clamp, caused by tightening the tensioning device, to produce a first radial restraining force on the shoes, and a secondary redundant source being a second radial restraining force, applied by way of the plurality of brackets, to the band clamp.

5 Claims, 5 Drawing Sheets

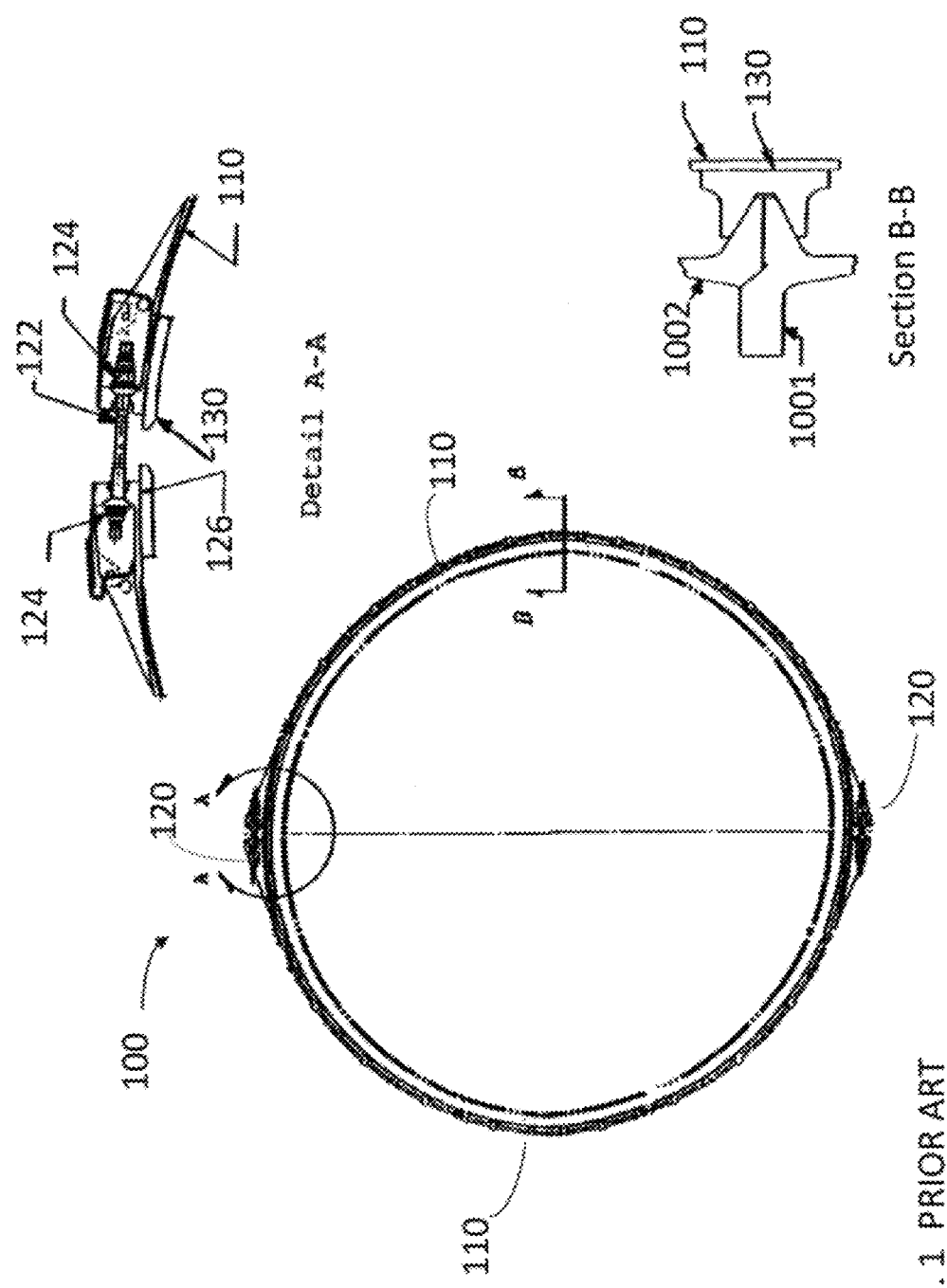

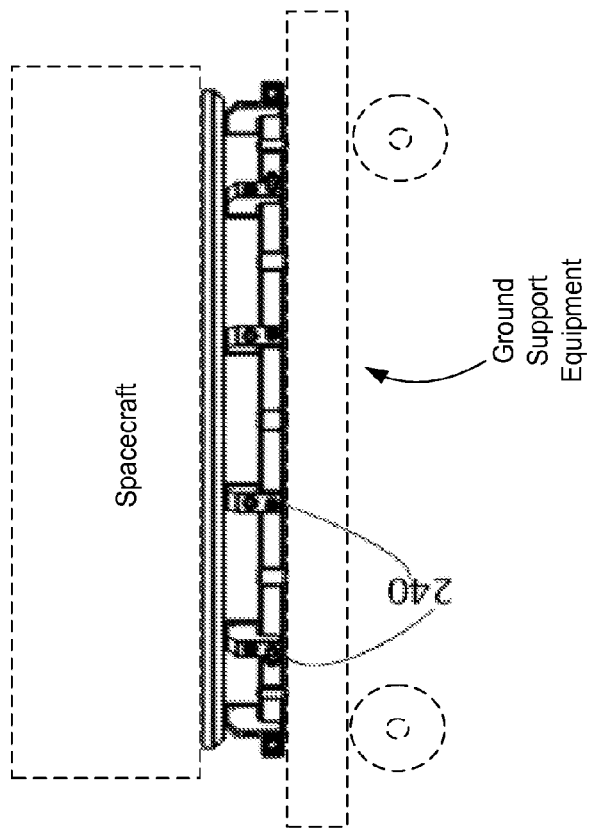
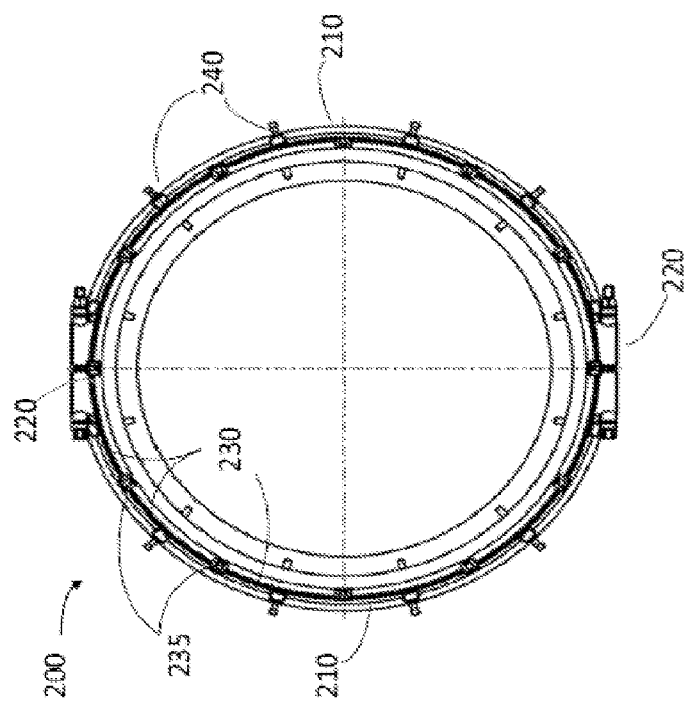
FIG. 2A

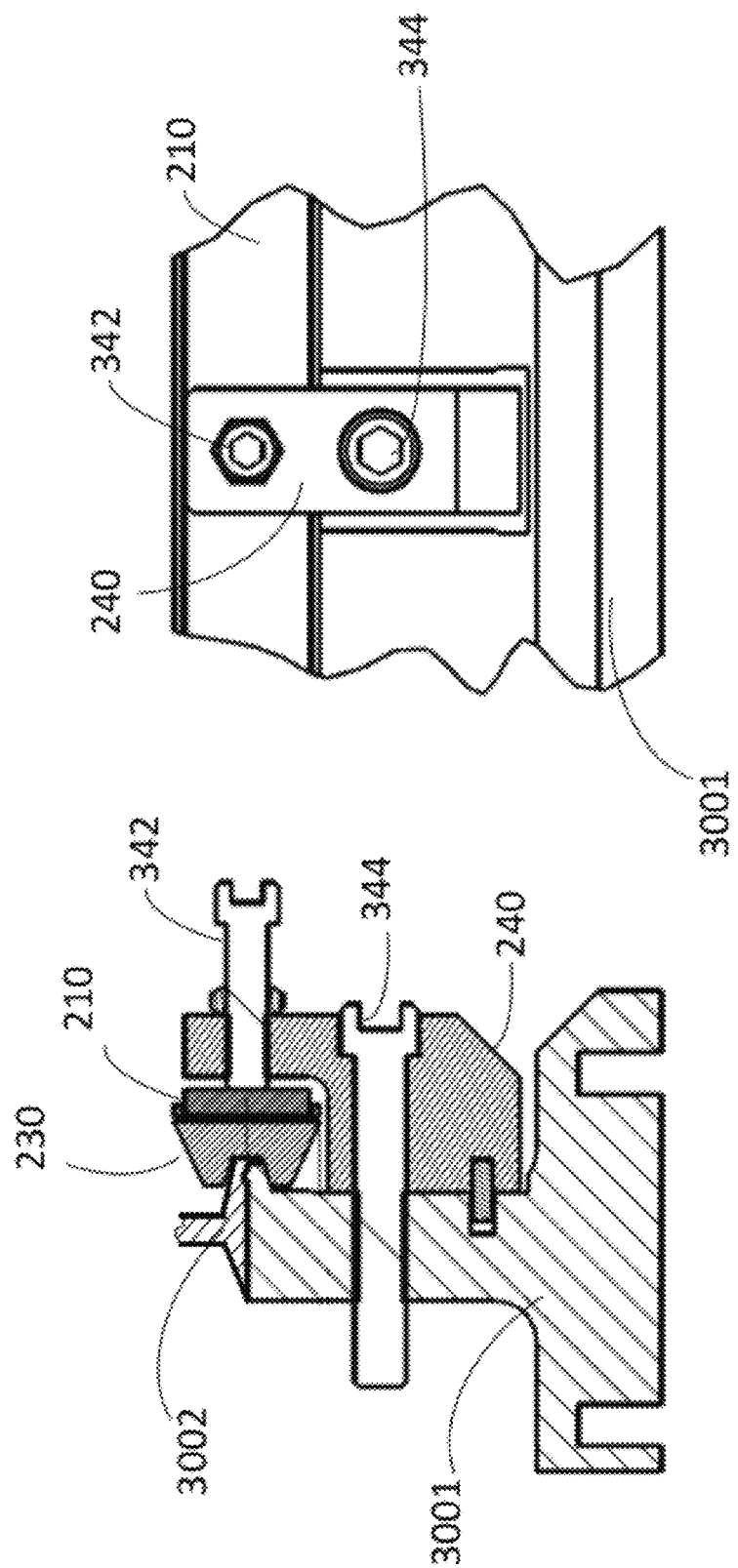

BAND CLAMP WITH REDUNDANT LOAD PATH

TECHNICAL FIELD

This invention relates generally to a clamping device and, in particular, to a V-band clamp, or marman clamp, having a redundant load path.

BACKGROUND

V-band clamps, also referred to as marman clamps, are a type of band clamp widely used in industrial and aerospace applications to detachably join or affix adjacent structures to one another. Marman clamps for payload separation systems are described in "MARMAN CLAMP SYSTEM DESIGN GUIDELINES", NASA Preferred Reliability Practices Guideline No. GDED-2214, (hereinafter, "NASA Guidelines") the content of which is hereby incorporated by reference into the present application. Referring to FIG. 1, band clamp arrangement 100 may include one or more band clamps (sometimes referred to as "straps") 110 and tensioning devices 120. A number of V-segments (referred to herein as "shoes") 130 are arranged on the interior surface of clamp 110. Band clamp arrangement 100 is configured to encircle abutting cylindrical flanges on each of two parts that are affixed to each other. Tensioning device 120 may include a bolt or stud 122, nuts 124, and end fitting 126. Tensioning of band clamp 110 creates an inward radial restraining force on the shoes which in turn wedge together the abutting cylindrical flanges (i.e., 1001 and 1002) of the two parts to be joined in the axial direction. The two parts to be joined may, for example be pipes, interface flanges of structures or vehicles, including aerospace systems such as launch vehicles and launch vehicle payloads.

As noted in the NASA Guidelines, structural failure of marman clamps are known to have occurred and "extreme care" is urged in designing such equipment.

The assignee of the present invention designs and manufactures spacecraft for communications and broadcast services. Structures of such spacecraft commonly include a structural interface ring which mates to a launch vehicle adapter ring by way of a marman band clamp that also serves as a separation system. During ground integration and test activities, the spacecraft is frequently mated to and demated from ground support equipment (GSE), such as handling dollies. A reusable marman band clamp, such as band clamp arrangement 100, may be detachably secured to the spacecraft structural interface ring, and to an abutting cylindrical flange on the GSE. While so mated, the band clamp will often experience high loads. For example, the spacecraft may undergo dynamic environmental testing while mated to a vibration machine; as another example, a spacecraft handling dolly may hold the spacecraft in a horizontal position during various integration activities, during which the reusable band clamp is required to restrain loads resulting from the cantilevered weight of the spacecraft.

During a spacecraft manufacturing life cycle, a considerable number of mating/demating operations may occur, using the reusable band clamp arrangement. As a result, operator error in installing the band clamp arrangement, and fatigue or other wear of the band clamp and/or its tensioning device, increase the risk of a structural failure that could result in a sudden breaking away of the spacecraft from the GSE. Consequently of such a failure may include injury or death of personnel, and structural damage to the spacecraft and nearby equipment.

In light of this risk, more reliable band clamp arrangements are desirable.

SUMMARY OF INVENTION

The present inventors have recognized that a band clamp arrangement may be provided with a redundant load path, whereby a failure of a band clamp or its tensioning device is prevented from propagating into a dangerous separation of the components joined by the band clamp arrangement. The redundant load path may be provided by a number of external brackets, each mounted to a first or a second of the components to be joined. Each external bracket may be configured to provide radial restraint on the band clamp proximate to a shoe of the band clamp arrangement, such that, even in the event of failure of the band clamp or the tensioning device, the shoes of the band clamp arrangement remain engaged with abutting cylindrical flanges on each of the components joined by the band clamp arrangement. Advantageously, the present disclosed techniques permit independent verification of both the conventional components of the band clamp arrangement and the redundant load path components.

In an embodiment a band clamp arrangement for detachably joining a first component and a second component has a band clamp, a tensioning device, a plurality of shoes, and a plurality of brackets. The band clamp arrangement is configured to cause the plurality of shoes to engage an abutting cylindrical flange of each of the first component and the second component, and to redundantly provide a sufficient clamping pressure to join the first component with the second component. Each of the plurality of brackets is attached to one of the first component and the second component. The sufficient clamping pressure results from redundant sources, a primary redundant source being circumferential tension in the band clamp, caused by tightening the tensioning device, to produce a first radial restraining force on the shoes, and a secondary redundant source being a second radial restraining force, applied by way of the plurality of brackets, to the band clamp to prevent disengagement of the shoes from the abutting cylindrical flanges.

In another embodiment the first component is a spacecraft and the second component is an article of ground support equipment.

In a further embodiment, at least one of the plurality of brackets comprises a tightening device to adjustably apply radial pressure to the band clamp proximate to a shoe, and an attachment device to detachably secure the bracket to one of the first component and the second component. The radial pressure applied to the band clamp by the tightening device may be substantially less than a pressure provided by the attachment device in securing the bracket to one of the first component and the second component.

In a yet further embodiment, the band clamp arrangement is configured to permit independent verification of each of the primary redundant source of clamping pressure and the secondary redundant source of clamping pressure.

In an embodiment, a first component and a second component are detachably joined with a band clamp arrangement. The band clamp arrangement has a band clamp, a tensioning device, a plurality of shoes, and a plurality of brackets. The band clamp arrangement is configured to cause the plurality of shoes to engage an abutting cylindrical flange of each of the first component and the second component and to redundantly provide a sufficient clamping pressure to join the first component with the second component. Detachably joining the first component and the second component includes: tightening the tensioning device, thereby causing circumferential tension in the band clamp to produce a radial restraining force on the shoes, resulting in a primary load path; attaching, with an attachment device, each of the plurality of brackets to one of the first component and the second component; and adjusting a tightening device of at least one of the plurality of brackets so as to apply radial pressure to the band clamp proximate to a shoe, resulting in a secondary load path.

In another embodiment, a radial pressure applied to the band clamp by the tightening device is substantially less than a pressure provided by the attachment device in securing the bracket to one of the first component and the second component.

In a further embodiment, after the adjusting step, each of the primary load path and the secondary load path are verified.

BRIEF DESCRIPTION OF THE DRAWINGS

Features of the invention are more fully disclosed in the following detailed description of the preferred embodiments, reference being had to the accompanying drawings, in which:

FIG. 1 illustrates a known band clamp arrangement.

FIGS. 2A and 2B illustrate a band clamp arrangement according to an embodiment.

FIG. 3 illustrates details of a band clamp arrangement according to an embodiment.

Figure 2B:
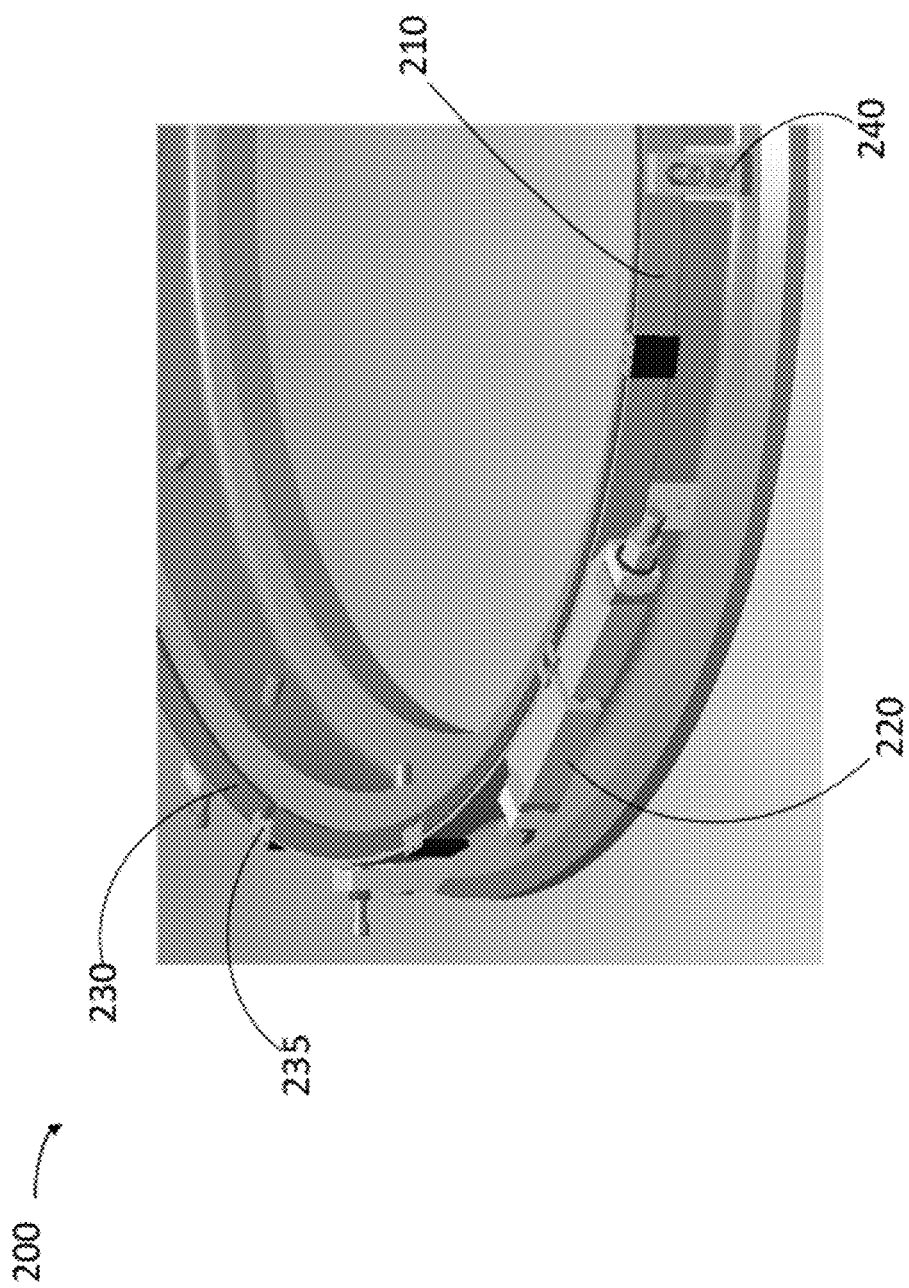

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

According to an embodiment of the presently disclosed techniques, a band clamp arrangement may have a redundant load path, whereby a failure of a band clamp or its tensioning device is prevented from propagating into a problematic separation of the components joined by the band clamp arrangement. Referring now to FIGS. 2A and 2B, band clamp arrangement 200 may include band clamps 210, tensioning devices 220 and shoes 230. In the illustrated embodiment, for example, band clamp arrangement 200 includes two band clamps 210, two tensioning devices 220, and twelve shoes 230, separated by spacers 235. Advantageously, band clamp arrangement 200 may also include external brackets 240. As described in more detail hereinbelow, external brackets 240 may be configured to provide radial restraint on band clamp 210 such that, even in the event of failure of band clamp 210 or tensioning device 220, shoes 230 remain engaged with abutting cylindrical flanges on each of the components joined by the band clamp arrangement.

Referring now to FIG. 3, in an embodiment, bracket 240 may be detachably secured to one of the components to be joined (in the illustrated embodiment, component 3001) by way of an attachment device (in the illustrated embodiment, bolt 344). Component 3001, in an embodiment, may be part of ground support equipment for a spacecraft and component 3002 may be a structural interface ring of the spacecraft. A tightening device (in the illustrated embodiment, bolt 342) may provide radial pressure against band clamp 210 so as to ensure that, even in the event of a failure of band clamp 210 or tensioning device 220, shoe 230 is prevented from disengaging from the abutting cylindrical flanges of component 3001 and component 3002. Advantageously, the radial pressure applied by bolt 342 is controlled to be relatively small compared, for example, to a pressure provided by bolt 344 in securing bracket 240 to component 3001. Appropriate torqueing values for bolt 342 and bolt 344 may be selected to achieve the above mentioned pressures. The inventors have appreciated that a relatively low torque value for bolt 342 is desirable to avoid risk of compromising the integrity of band 210 or shoe 230 installation. For example, in an embodiment, a torque value of 7-10 foot-pounds may be applied to bolt 342, whereas a torque of approximately 160 foot pounds may be applied to bolt 344.

Advantageously, the presently disclosed techniques permit independent inspection and verification both of conventional components of band clamp arrangement 200 associated with the primary load path, as well as components associated with the redundant load path (e.g., brackets 240, bolts 342 and bolts 344). For example, a torque value of tensioning device 220 may be inspected before and after installation of brackets 240. Likewise, visual inspection of band 210, tensioning device 220 and bracket 240 may be performed independently, as may inspection of a torque value of each bolt 342 and 344. As a result, each of two redundant load paths may be independently verified.

Figure 4:
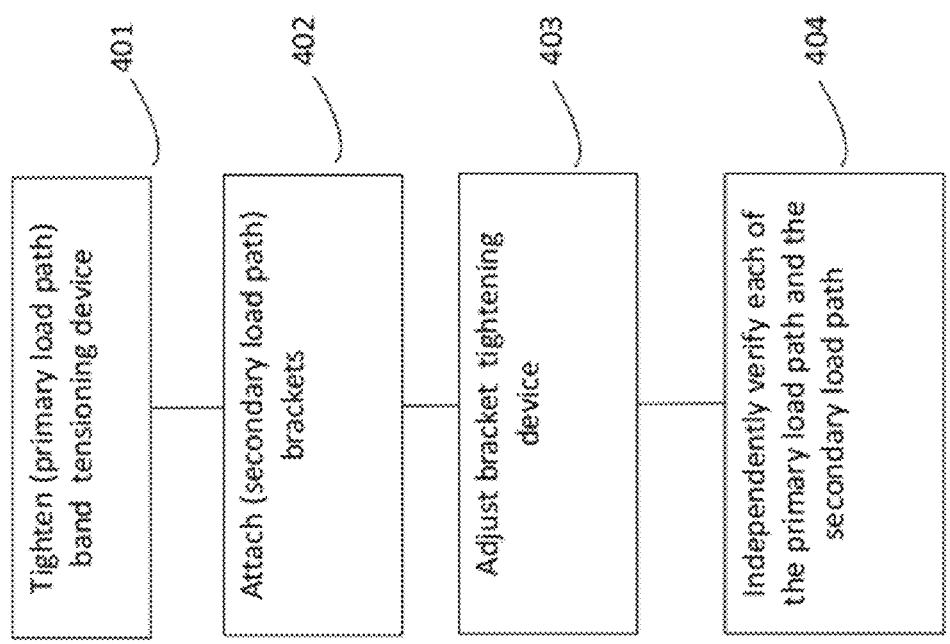
FIG. 4 illustrates a method of installing a band clamp arrangement according to an embodiment.

Referring now to FIG. 4, a method for detachably joining a first component and a second component with a band clamp arrangement is illustrated. As discussed hereinabove, the band clamp arrangement may include a band clamp, a tensioning device, a plurality of shoes, and a plurality of brackets. The band clamp arrangement may be configured to cause the plurality of shoes to engage an abutting cylindrical flange of each of the first component and the second component and to redundantly provide a sufficient clamping pressure to join the first component with the second component. At block 401, the tensioning device may be tightened so as to provide a primary redundant source of clamping pressure, resulting from circumferential tension in the band clamp inducing a radial restraining force on the shoes. At block 402, each of a number of brackets may be attached to one of the first component and the second component. All of the brackets may be attached to a single one of the first component and the second component, but this is not necessarily so. At block 403, a tightening device may be adjusted to apply radial pressure to the band clamp proximate to a shoe. At block 404 each of the primary load path and the secondary load path may be independently verified by, for example, visual inspection and inspection of torque values.

Thus, techniques for an improved band clamp arrangement have been disclosed, that provides a redundant load path such that a failure of a band clamp or its tensioning device is prevented from propagating into a dangerous separation of the components joined by the band clamp arrangement.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
   a band clamp arrangement for detachably joining a first component and a second component, said band clamp arrangement comprising:
   a band clamp, a tensioning device, a plurality of shoes, and a plurality of brackets, the band clamp arrangement configured to cause the plurality of shoes to engage an abutting cylindrical flange of each of the first component and the second component, and to redundantly provide a sufficient clamping pressure to join the first component with the second component, wherein
   each of the plurality of brackets is attached to one of the first component and the second component, at least one of the plurality of brackets comprising a tightening device; and
   the sufficient clamping pressure results from redundant sources, a primary redundant source being circumferential tension in the band clamp, caused by tightening the tensioning device, to produce a first radial restraining force on the shoes, and a secondary redundant source being a second radial restraining force, applied, by way of the plurality of brackets, to the band clamp to prevent disengagement of the shoes from the abutting cylindrical flanges, wherein:
   the tightening device is configured to produce the second radial restraining force by adjustably applying radial pressure to the band clamp.

2. The apparatus of claim 1, wherein the first component is a structural interface ring of a spacecraft and the second component is part of a ground support equipment for the spacecraft.

3. The apparatus of claim 1, wherein at least one of the plurality of brackets comprises an attachment device to detachably secure the bracket to one of the first component and the second component.

4. The apparatus of claim 3, wherein the radial pressure applied to the band clamp by the tightening device is substantially less than a pressure provided by the attachment device in securing the bracket to one of the first component and the second component.

5. The apparatus of claim 1, wherein the apparatus is configured to permit independent verification of each of the primary redundant source of clamping pressure and the secondary redundant source of clamping pressure.

* * * * *